(12) United States Patent
Jagana et al.

(10) Patent No.: US 7,899,456 B2
(45) Date of Patent: Mar. 1, 2011

(54) METHOD FOR FASTER MOBILITY HANDOFF OF A MOBILE NODE

(75) Inventors: Venkata R. Jagana, Portland, OR (US); Krishna Kumar, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/303,230

(22) Filed: Dec. 16, 2005

(65) Prior Publication Data

US 2007/0140170 A1   Jun. 21, 2007

(51) Int. Cl.
   *H04W 4/00*   (2009.01)
(52) U.S. Cl. .......... 455/435.1; 455/453; 455/435.2; 455/435.3; 370/349; 709/228
(58) Field of Classification Search .......... 370/242, 370/331, 338, 349; 455/435.1, 453, 435.2, 455/435.3; 709/228
   See application file for complete search history.

(56) References Cited

U.S. PATENT DOCUMENTS

| | | | |
|---|---|---|---|
| 6,230,012 B1 | 5/2001 | Willkie et al. | 455/435 |
| 6,539,225 B1 | 3/2003 | Lee | 455/436 |
| 6,628,943 B1 | 9/2003 | Agrawal et al. | 455/432.1 |
| 6,795,705 B1* | 9/2004 | Warrier et al. | 455/435.1 |
| 7,447,188 B1* | 11/2008 | Dommety et al. | 370/342 |
| 7,587,498 B2* | 9/2009 | Leung et al. | 709/228 |
| 2001/0036834 A1 | 11/2001 | Das et al. | 455/458 |
| 2002/0080752 A1* | 6/2002 | Johansson et al. | 370/338 |
| 2002/0122412 A1 | 9/2002 | Chen et al. | 370/349 |
| 2003/0073439 A1* | 4/2003 | Wenzel et al. | 455/435 |
| 2003/0095523 A1 | 5/2003 | Korus et al. | 370/338 |
| 2003/0119506 A1 | 6/2003 | Singhai et al. | 455/435 |
| 2003/0142650 A1 | 7/2003 | Fan | 370/338 |
| 2003/0153325 A1 | 8/2003 | Veerepalli et al. | 455/453 |
| 2003/0161287 A1 | 8/2003 | Venkitaraman et al. | 370/338 |
| 2003/0185196 A1 | 10/2003 | Venkitaraman | 370/351 |
| 2004/0032844 A1 | 2/2004 | Lewis et al. | 370/338 |
| 2004/0090941 A1 | 5/2004 | Faccin et al. | |
| 2004/0090942 A1 | 5/2004 | Flinck | |
| 2005/0144303 A1 | 6/2005 | Zhang et al. | |
| 2005/0213545 A1* | 9/2005 | Choyi et al. | 370/338 |

OTHER PUBLICATIONS

Tandjaoui et al., "Performance Analysis of Binding Update in Mobile IP during Handoff," p. 503-511, Sep. 2004.*

"A Proposal Seamless Handoff Method for Cellular Internet Environments", S. Ohzahata, et al.; IEICE Transactions on Communications, vol. E84-B, No. 4, pp. 752-759 Apr. 2001.

(Continued)

*Primary Examiner*—Pierre-Louis Desir
(74) *Attorney, Agent, or Firm*—Lieberman & Brandsdorfer, LLC

(57) ABSTRACT

When a mobile node moves to a network (foreign network) other than its home network, it must register with the home network so that the home agents are able to tunnel messages to the mobile node while it is operating in the foreign network. The present invention enables the mobile node to register with its home network substantially faster than it would take the mobile node to register under the currently available methods. The mobile node of the present invention includes a retrieval module and a registration module that allows it to register with the home network in accordance with the present invention.

21 Claims, 7 Drawing Sheets

OTHER PUBLICATIONS

"Internet Mobility Support Optimized for Client Access and Its Scalable Authentication Framework", Sufratrio, et al.; Mobile Data Access First International Conference MDA '99 Proceedings( Lecture Notes in Computer Science vol. 1478) pp. 220-229.

"Seamless Intra-Domain Handoff Using Simultaneous Bindings", D. Tandjaoui, et al.; Book of Abstracts . ACS/IEEE International Conference on Computer Systems and Applications p. 39 Jul. 14-18, 2003.

* cited by examiner

METHOD FOR FASTER MOBILITY HANDOFF OF A MOBILE NODE

FIELD OF THE INVENTION

The present invention relates to networking technology, and in particular, the present invention relates to providing a faster and more efficient mobility handoff of a mobile node when a mobile node travels to a foreign network.

BACKGROUND OF THE INVENTION

By way of background, in today's world, mobile equipment, such as laptop computers, cellular phones, personal handheld computers (also know as PDAs) and the likes, are used by everyone to conduct personal and work related business. The employees of a company are able to access the full resources of their employer while traveling or working from home. Cellular phones are enabling everyone to stay in touch with work and friends and family while in move. This capability has become increasingly important in today's personal and business life. Different networks are used by each of the above mentioned mobile equipment to connect to its destination. For example, cellular phone users may use the network of their cellular service providers when they are operating at their home service location, also know as the home network, or the network of the same provider or another cellular service provider at a different service location, also known as the foreign network, while out of their home network. An employee of a company connects to the resources of the company and other company employees using the Intranet of the company (i.e., home network) or other networks (i.e., foreign networks) while outside of the coverage of the company Intranet.

Referring to FIG. 1, a conceptual representation of a typical network 10 is shown. Network 10 includes home agents $12_1$ and $12_2$ (collectively referred to as home agents 12) and nodes 14-18. It should be noted that although only two home agents are shown in FIG. 1, the network of FIG. 1 may include more or less than two home agents. It should also be noted that network 10 may include additional components that are not shown in FIG. 1 for simplicity. Also, although three nodes 14-18 are shown in FIG. 1, network 10 may have more than three nodes. In network 10, nodes 14-18 communicate with each other and home agents 12 through network connection 20. Network connection 20 includes wired and wireless networks, Ethernet-type networks, intranets, extranets, the Internet, and/or telephony networks, among other types of networks. In addition to communicating with each other, each of nodes 14-18 could also communicate with nodes in other networks that are connected to network 10.

Each of nodes 14-18 could be permanently attached to network 10 or may be a mobile node. A mobile node may communicate with other nodes within network 10 or other networks while operating in network 10 or while operating in another network as a guest node. When nodes 14-18 are operating in network 10, they are operating within their home network. When they are operating in networks other than network 10, they are operating in a foreign network as a guest. In FIG. 1, node 14 is designated as the mobile node for the purpose of describing the present invention. Although node 14 is designated as the mobile node in network, nodes 16 and 18 could also be mobile nodes.

When mobile node 14 is operating in network 10, it obtains an Internet Protocol (IP) address (hereinafter referred to as the "home address"). There are different mechanisms by which mobile node 14 obtains a home address. These mechanisms are known to those knowledgeable in the art and, thus, will not be discussed any further herein. The home address is used by home agents 12, nodes 16 and 18, and nodes and home agents (not shown) belonging to networks other than network 10 to communicate with node 14.

Each time that the mobile node 14 leaves its home network 10 and enters a foreign network or each time that node 14 leave a foreign network and enters another foreign network, the mobile node 14 obtains a new IP address, which is also referred to as the care-of address. While mobile node 14 operates within the foreign network, the mobile node 14 communicates with the correspondent nodes. The correspondent nodes include home agents and correspondent nodes. The correspondent nodes are those nodes other than the home agents that either establish one or more communication sessions with mobile node 14 or that mobile node 14 establishes one or more communication sessions with them. While the mobile node 14 is in a foreign network, the correspondent nodes communicate with the mobile node in one of at least two ways. First, the correspondent nodes may send messages to the mobile node 14 using the home address. In this situation, the home agent 12 that services the mobile node 14 ("the servicing home agent 12") would then tunnel the message to the mobile node 14 at its foreign network location. In order, for the servicing home agent 12 to be able to tunnel the message to the mobile node 14, it needs to know the care-of address of the mobile node 14. Alternatively, the correspondent nodes may communicate with the mobile node 14 directly using the care-of address that mobile node 14 obtains upon entering the foreign network. The process of informing the home agents 12 by mobile node 14 of its new care-of address is also referred to as home registration.

Referring to FIG. 1, the home registration begins with mobile node 14 sending its binding information using a Binding Update packet ("BU") to a home agent on the list of home agents that are capable to service mobile node 14 while it is operating in the foreign network. The mobile node 14 either has the list of the home agents that can support it in its memory before it moves to the foreign network, or the mobile node 143 obtains the list of home agents after entering the foreign network. If the mobile node needs to obtain the list of the home agents after it enters the foreign network, it sends an inquiry message to obtain the list of the home agents 12. One example of such inquiry message is a Dynamic Home Agent Address Discovery ("DHAAD") message that follows the protocol set forth in the Mobile IPV6 standard. Hereinafter, the present invention will be described using a DHAAD message as the inquiry message. However, it is clear to one knowledgeable in the art that any other suitable message may be used by the mobile node to determine which home agents can support it while it is operating in a foreign network.

Upon receiving the DHAAD message by the home agents 12, one of the home agents 12 responds to the mobile node by sending the mobile node a DHAAD reply message according to the protocol set forth by the Mobile IPV6 standard. The DHAAD reply message includes a list of all home agents 12 that can support the mobile node while it is operating in the foreign network. In exemplary network of FIG. 1, home agent $12_2$ sends the DHAAD reply message listing home agent $12_1$ and $12_2$ as the eligible home agents to provide support to mobile node 14. Once the mobile node 14 receives the DHAAD reply message, it saves the list in its local memory and, in accordance with the Mobile IPV6 standard and as mentioned above, sends its binding information using a BU packet to the home agent $12_1$, which is the first home agent on the list. In accordance with this standard, mobile node 14 waits for a certain period of time to receive an acknowledgement from home agent $12_1$ and if it does not receive such acknowledgement, it retransmits the BU message to home agent $12_1$.

Referring to FIG. 2, timeline 40 provides the time intervals that the BU message must be retransmitted to home agent $12_1$ if the mobile node 14 does not receive an acknowledgement from it. If home agent $12_1$ is off-line, meaning that it is not connected to the network for any reason (such as being down), it will not respond to the transmission of the BU by mobile node 14. However, in accordance to Mobile IPV6 standard, if mobile node does not receive a response from home agent $12_1$ within 1.5 seconds, it must retransmit its BU message to home agent $12_1$ (time T1(1)). Thereafter, if mobile node 14 does not receive a response from home agent $12_1$, within 3 seconds (twice as much as the previous waiting period), it must retransmit its BU message to home agent $12_1$ (time T1(2)). This process continues until mobile node 14 retransmits its BU message to home agent $12_1$ at time T5(1), the last BU message, and still does not receive a reply message from home agent $12_1$ within 32 seconds. If the mobile node 14 does not receive an acknowledgement message from home agent $12_1$, in response to any of the BU messages that were sent to home agent $12_1$ in accordance with the IPV6 standard, it repeats the above process for the next home agent on its list. Hence the total wait time according to the IPV6 standard before a registration attempt to a home agent is deemed failed is 78.5 second (1.5+3+6+12+24+32). In the exemplary network of FIG. 1, the next home agent on the list is home agent $12_2$. The mobile node begins the process of sending its BU message according to timeline 42.

As shown on timeline 42, the first transmission of BU to home agent $12_2$ will occur at time T0(2), which is at least 78.5 seconds (1.5+3+6+12+24+32) after the first transmission to home agent $12_1$. In another words, in the situation explained above, mobile node 14 must wait for a total of at least 78.5 seconds (1.5+3+6+12+24+32) before it concludes that home agent $12_1$ is off-line or will not respond to it for any reason and to try the next home agent on the list. This happens each time that a home agent on the list fails to respond to mobile node 14. In another words, each time that a home agent fails to respond to mobile node 14, mobile node 14 must wait for 78.5 seconds before it sends its BU message to the next home agent on the list. In situations where more than one home agent on the list fail to respond to mobile node 14, the wait period increases by multiples of 78.5 seconds in accordance with the number of consecutive home agents that fail to respond to mobile node 14. This is not an acceptable situation.

For the reasons stated above, there is a need for a solution that minimizes the wait time for a mobile node while it is trying to register its care-of-address with its home network.

SUMMARY OF THE INVENTION

The foregoing problems are solved and an advance in the art is made by a method, system and computer program product for ensuring a faster home registration (i.e., mobility handoff) by the mobile node after it enters a foreign network.

A method of home registration by a mobile node when the mobile node moves to a foreign network is provided by the present invention. The method of the present invention includes performing a first registration by sending a first plurality of registration messages to a first home agent. The next one of the first plurality of registration messages is sent to the first home agent if the first home agent fails to respond to a current registration message sent to it. Furthermore, the first registration fails if the first home agent fails to respond to the first plurality of messages within a first predetermined time. The method further includes a second registration by sending a registration message to a second home agent if the first home agent fails to respond to a current one of the first plurality of registration messages and if a second predetermined time has elapsed since a first one of a first plurality of registration messages is sent. The second predetermined period of time is shorter than the first predetermined period of time.

In one embodiment of the present invention, the mobile node moves to the foreign network from its home network.

In another embodiment of the present invention, the mobile node moves from one foreign network to another.

In yet another embodiment of the present invention, the first and second home agents are included in a list of the home agents. The list of home agents either exists in the mobile node is obtained from the home network of the mobile node prior to sending a first plurality of the registration messages to the first home agent.

In yet another embodiment of the present invention, a network embodying the present invention includes a plurality of home agents, and a mobile node. The mobile node includes a registration unit for enabling the mobile node to register with the network when it moves to a second network. The registration is conducted by performing a first registration by sending a first plurality of registration messages to a first home agent. A next one of the first plurality of registration messages is sent to the first home agent if the first home agent fails to respond to a current registration message sent to it. Also, the first registration fails if the first home agent fails to respond to the first plurality of messages within a first predetermined time. The registration unit performs a second registration by sending a registration messages to a second home agent if the first home agent fails to respond to a current one of the first plurality of registration messages and if a second predetermined time has elapsed since the first one of a first plurality of registration messages is sent. The second predetermined period of time is shorter than the first predetermined period of time.

In yet another embodiment of the present invention a mobile node is provided. The mobile node includes a processor unit and a registration unit operatively coupled to the processor unit. The registration unit enables the processor unit to register with a home network of the mobile node when the mobile node moves to a second network. The registration unit sends a first plurality of registration messages to a first home agent. A next one of the first plurality of registration messages is sent to the first home agent if the first home agent fails to respond to a current registration message sent to it. Also, the first registration fails if the first home agent fails to respond to the first plurality of messages within a first predetermined time. The registration unit also sends a registration message to a second home agent if the first home agent fails to respond to a current one of the first plurality of registration messages and a second predetermined time has elapsed since a first one of the first plurality of registration messages is sent. The second predetermined period of time is substantially shorter than the first predetermined period of time.

In yet another embodiment of the present invention, an article of manufacture including code executed to perform operation to enable a mobile node to register with its home network when the mobile node moves to a foreign network is provided. The operation includes performing a first registration by sending a first plurality of registration messages to a first home agent. A next one of the first plurality of registration messages is sent to the first home agent if the first home agent fails to respond to a current registration message sent to it. The first registration fails if the first home agent fails to respond to the first plurality of messages within a first predetermined time. The operation further includes performing a second registration by sending a registration message to a second home agent if the first home agent fails to respond to a current one of the first plurality of registration messages and a second predetermined time has elapsed since a first one of the first plurality of registration messages is sent. The second predetermined period of time is shorter than the first predetermined period of time.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF EXEMPLARY EMBODIMENTS

Figure 1:
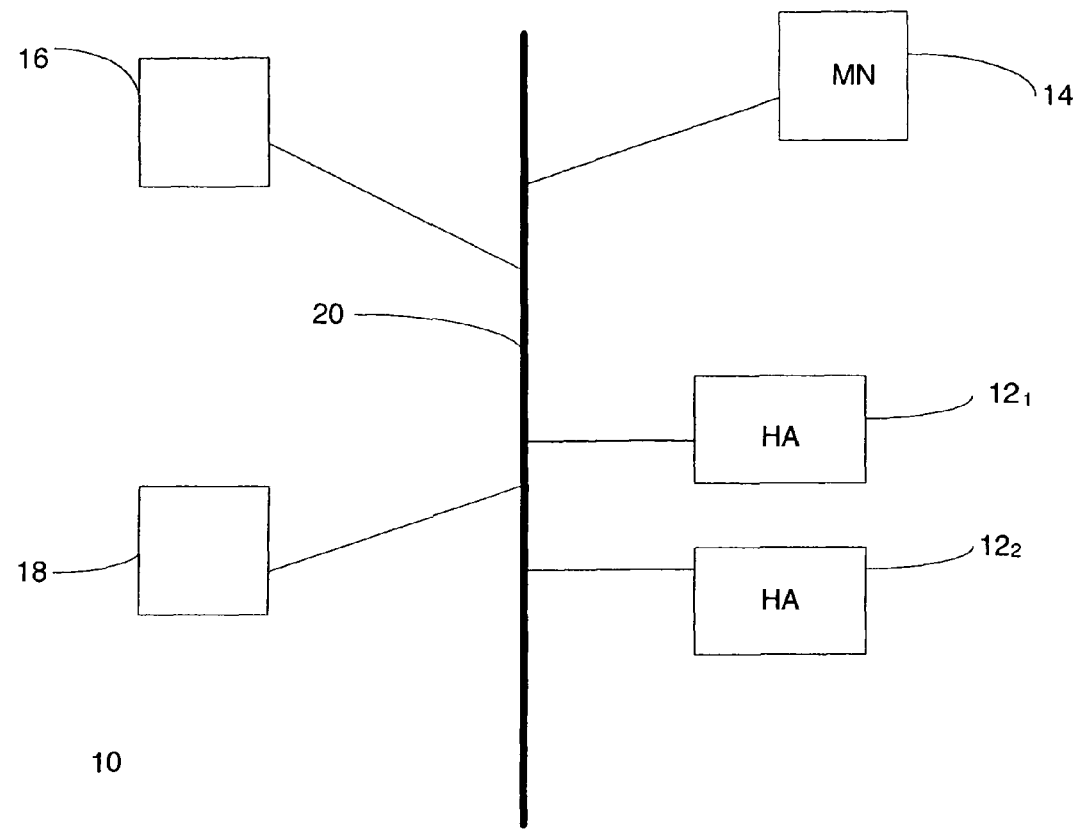
FIG. 1 is a block diagram of a network.
Figure 2:
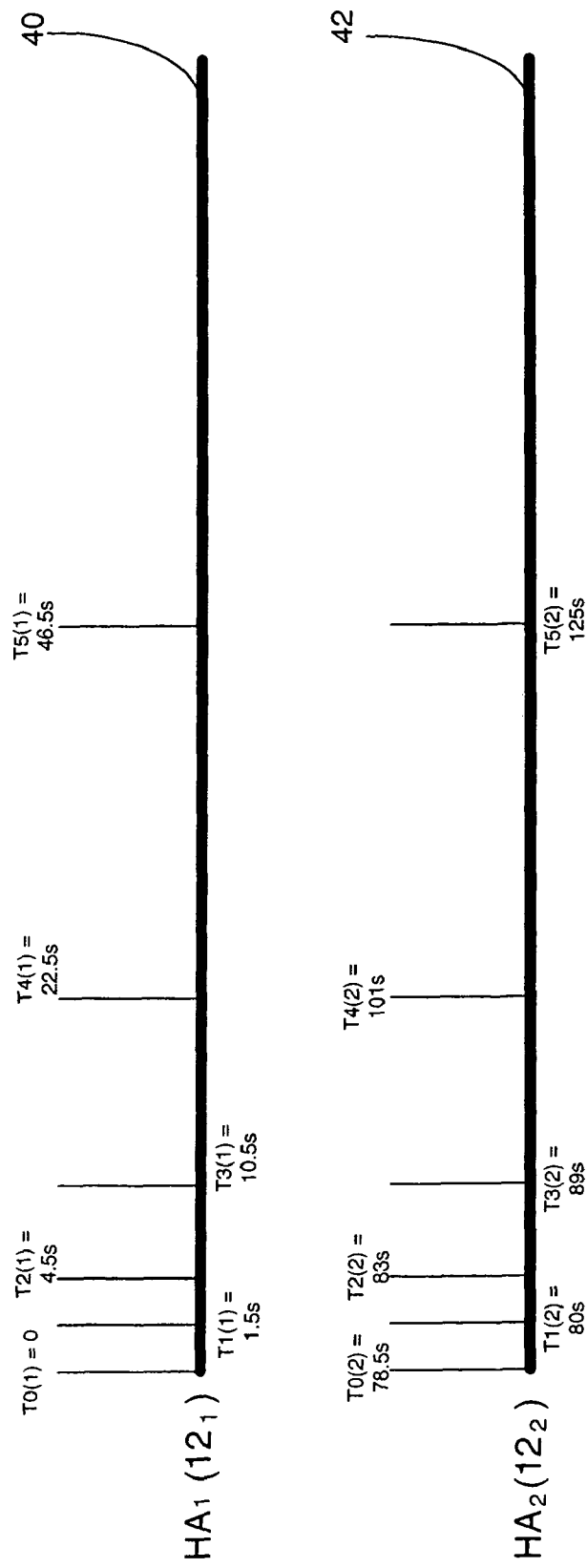
FIG. 2 is timing diagram providing the timelines for sending BU messages according to the currently available methods.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "certain embodiment," "one embodiment," or "an embodiment" means that a particular feature, structure, or characteristic described in connection with the embodiment is included in at least one embodiment of the present invention. Thus, appearances of the phrases "a select embodiment," "certain embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The method, apparatus and article of manufacturing of the present invention provides advantage over the prior art. According to the present invention, when a mobile node moves to a foreign network, the home registration process is substantially faster than the process employed in the prior art. The mobile node may move to a foreign network from its home network or from another foreign network. In accordance with the present invention, the mobile node first obtains a list of home agents that may be able to provide service to it while it is operating in the foreign network. Thereafter, the mobile node begins the process of registering with its home network by sending a BU message to the first home agent. After a threshold period of time that is much shorter than the wait time to send the BU message to the next home agent as required in the prior art, the present invention sends the BU message to the next home agent on the list. This process continues for the rest of the home agents until one home agent acknowledges the receipt of the BU message by replying to the mobile node. In accordance with the present invention, the total time that takes for the mobile node to register with its home network is substantially shorter than the prior art methods of registering with the home network.

Technical Details

Figure 3:
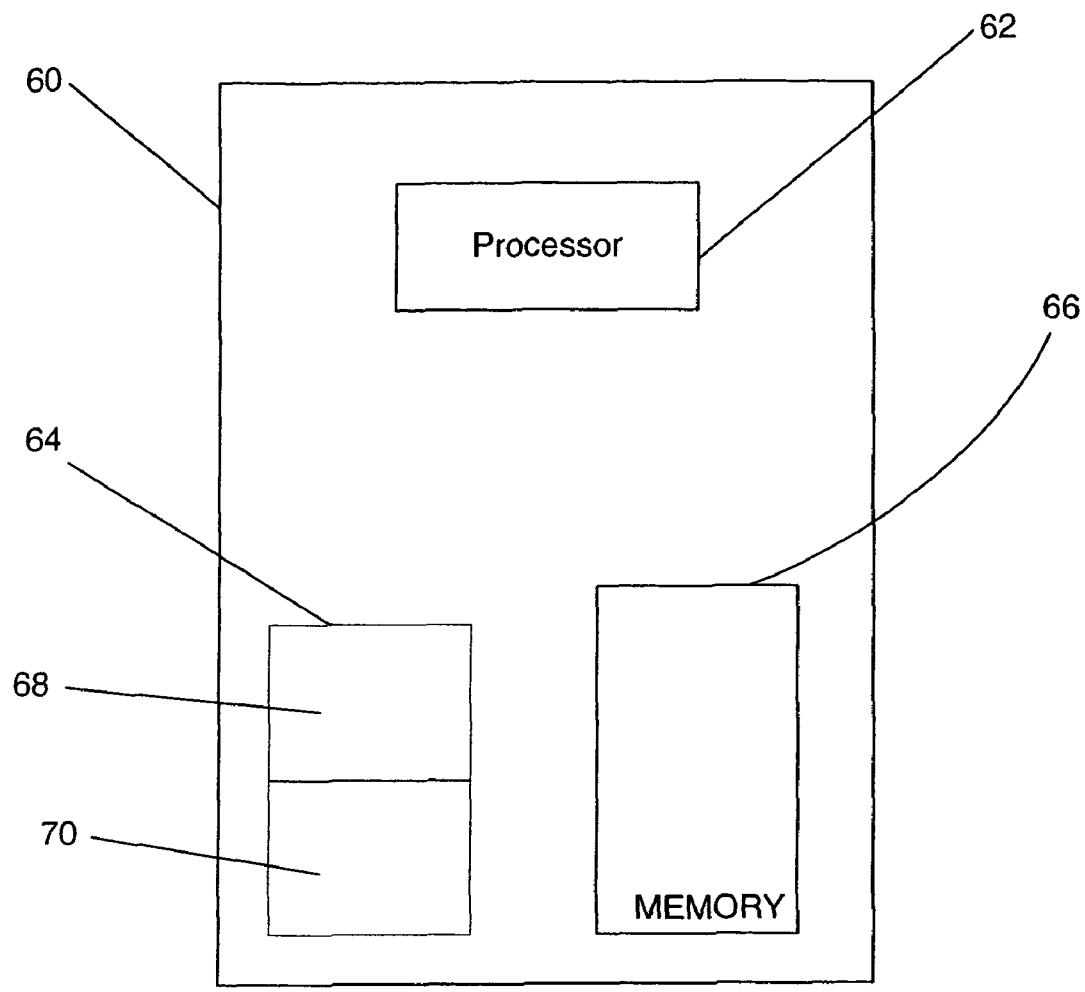
FIG. 3 is a block diagram of a mobile node according to the present invention.

Referring now to FIG. 3, there is illustrated a block diagram of an exemplary mobile node 60 according to the present invention. Mobile Node 60 includes a processing unit 62 ("processor"), update module 64, and a persistent memory 66. The update module 62 further includes a retrieval module 68 and a registration module 70. The retrieval module 68 provides the capability of obtaining a list of home agents that can provide service to mobile node 60 either from the persistent memory 66 or from the home network of mobile node 60. Where, the retrieval module 68 obtains the list of the home agents from the persistent memory 66, such list could have been stored in the persistent memory prior to the move by mobile node 60 to the foreign network. The registration module 60 enables the mobile node 60 to register with its home network. As it will be explained in detail below, the combination of the processor 62, retrieval module 68, and the registration module 70 enables the mobile node 60 to successfully and quickly register with its home network in accordance with the present invention. It should be noted that mobile node 60 may include other components that are not shown in FIG. 3 for simplicity. Furthermore, it should be noted that the update module 64 may be implemented using hardware, software, or a combination thereof. When the update module 64 is implemented in software, in implementation, it may reside in the persistent memory 66.

Figure 4:
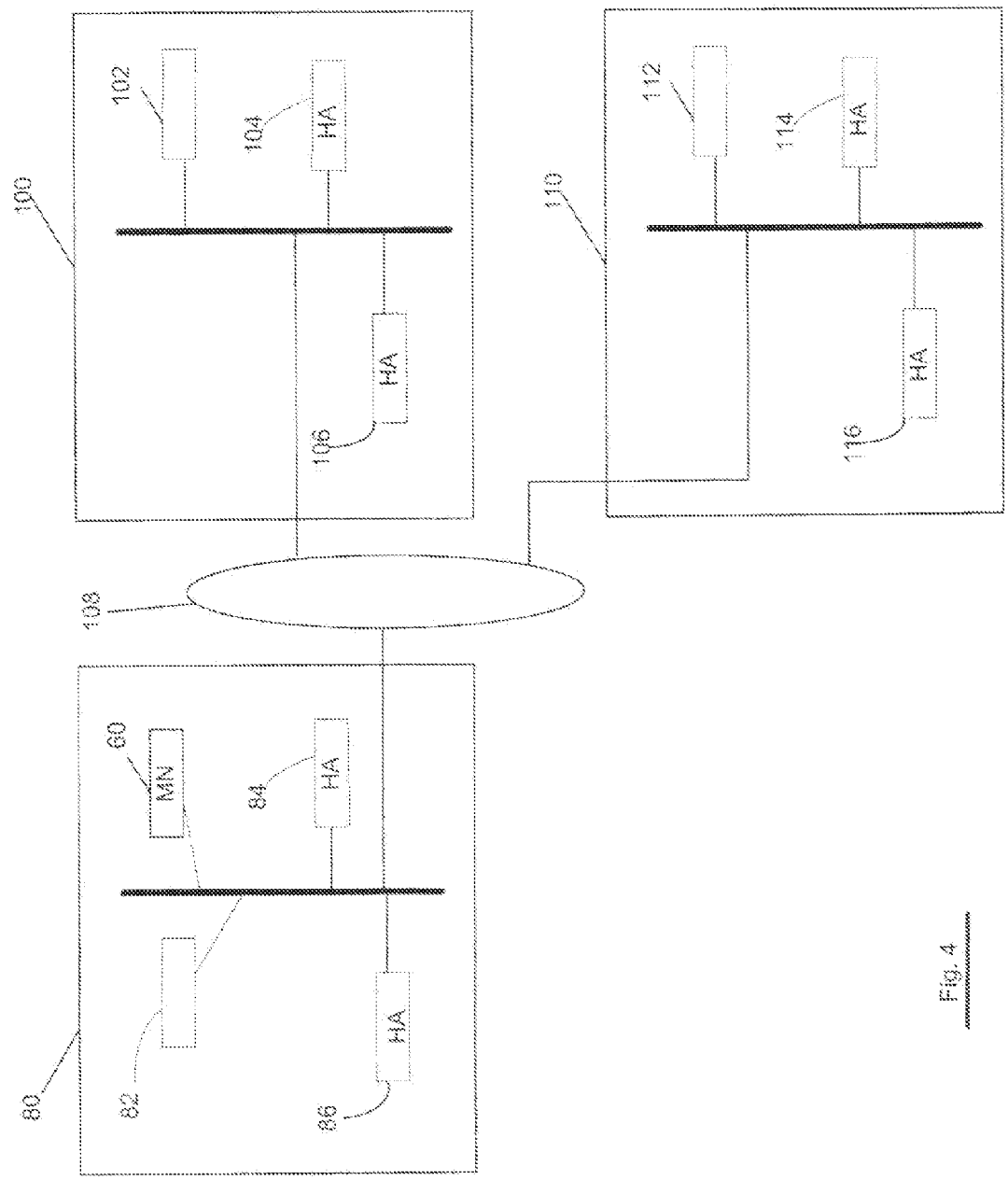
FIG. 4 is a block diagram of three networks, one of which is the home network of the mobile node of the present invention.

Referring to FIG. 4, a schematic representation of three networks 80, 100, and 110 is shown. Network 80 includes mobile node 60 of the present invention, node 82, and home agents 84 and 86. Network 100 includes node 102, and home agents 104 and 106. Network 110 includes node 112, and home agents 114 and 116. Networks 80, 100 and 110 are connected together via network connection 108. Network connection 108 may include wired and wireless networks, Ethernet-type networks, intranets, extranets, the Internet, and/or telephony networks, among other types of networks. It should be noted that only certain elements of the networks 80, 100 and 110 are shown for simplicity. In fact each of networks 80, 100 and 110 may include more elements such as nodes, home agents, etc.

As shown in FIG. 4, network 80 is the home network of mobile node 60. Thus, when mobile node 60 operates in its home network, it communicates with other nodes in the home network and in any foreign networks, such as network 100, using the home address that it obtains from the home network. However, when mobile node 60 enters a foreign network, such as networks 110 and 110, it obtains a new IP address, which is also known as a care-of address, from the foreign network. In one embodiment of the present invention, the mobile node 60 may move from home network 80 to one of the two other foreign networks 100 and 110. In this situation mobile node 60 must register with its home network 80 to provide its home network with its care-of address. In another embodiment of the present invention, the mobile node 60 may move from the current foreign network, for example network 100, that is operating in to another foreign network, for example network 110. In such situation, mobile node 60 obtains a new care-of address in network 110 and must again register with its home network 80. The process of home registration in accordance with the present invention that will be described in details below applies to either a move by mobile node 60 from its home network to a foreign network or a move by the mobile node 60 from a first foreign network to a second foreign network. Hereinafter, the process of home registration in accordance with the present invention will be described with respect to a move by mobile node 60 from its home network 80 to foreign network 110 for simplicity only.

Figure 5:
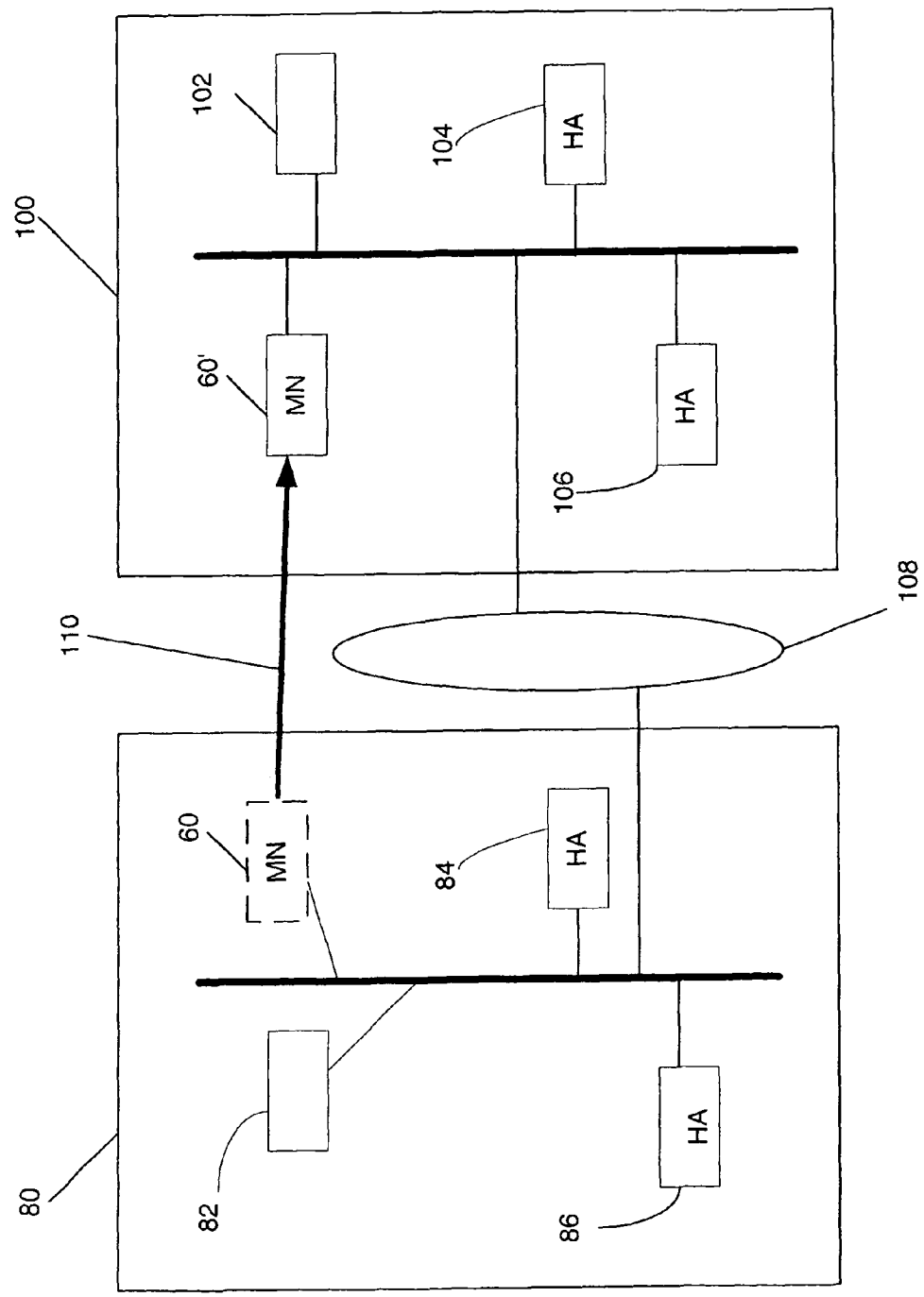
FIG. 5 is a block diagram of the networks of FIG. 4, wherein the mobile node of present invention has entered in to a foreign network from its home network.

Referring to FIG. 5, it is shown that mobile node 60 has moved to network 100. The mobile node 60 is represented by the cut lines in network 80 to indicate that it has moved to network 100. The move is also represented by the arrow 118. In network 100, mobile node 60 is now referred to as mobile node 60'. When mobile node 60' obtains a care-of address, it must communicate this information to one of the home agents 84 or 86 to ensure that the home agents are able to tunnel messages to mobile node 60' while it is operating in the foreign network. As mentioned above, this process is referred to as the "home registration process."

As described above, the prior art method of home registration that may be employed by the mobile nodes while operating in a foreign network would lead to a substantial period of time where the mobile node is not able to establish communication with its home network while it is trying to identify a home agent that is able to provide service to it while operating in the foreign network. This period of inactivity by the mobile network substantially degrades its performance and is not acceptable.

Figure 6:
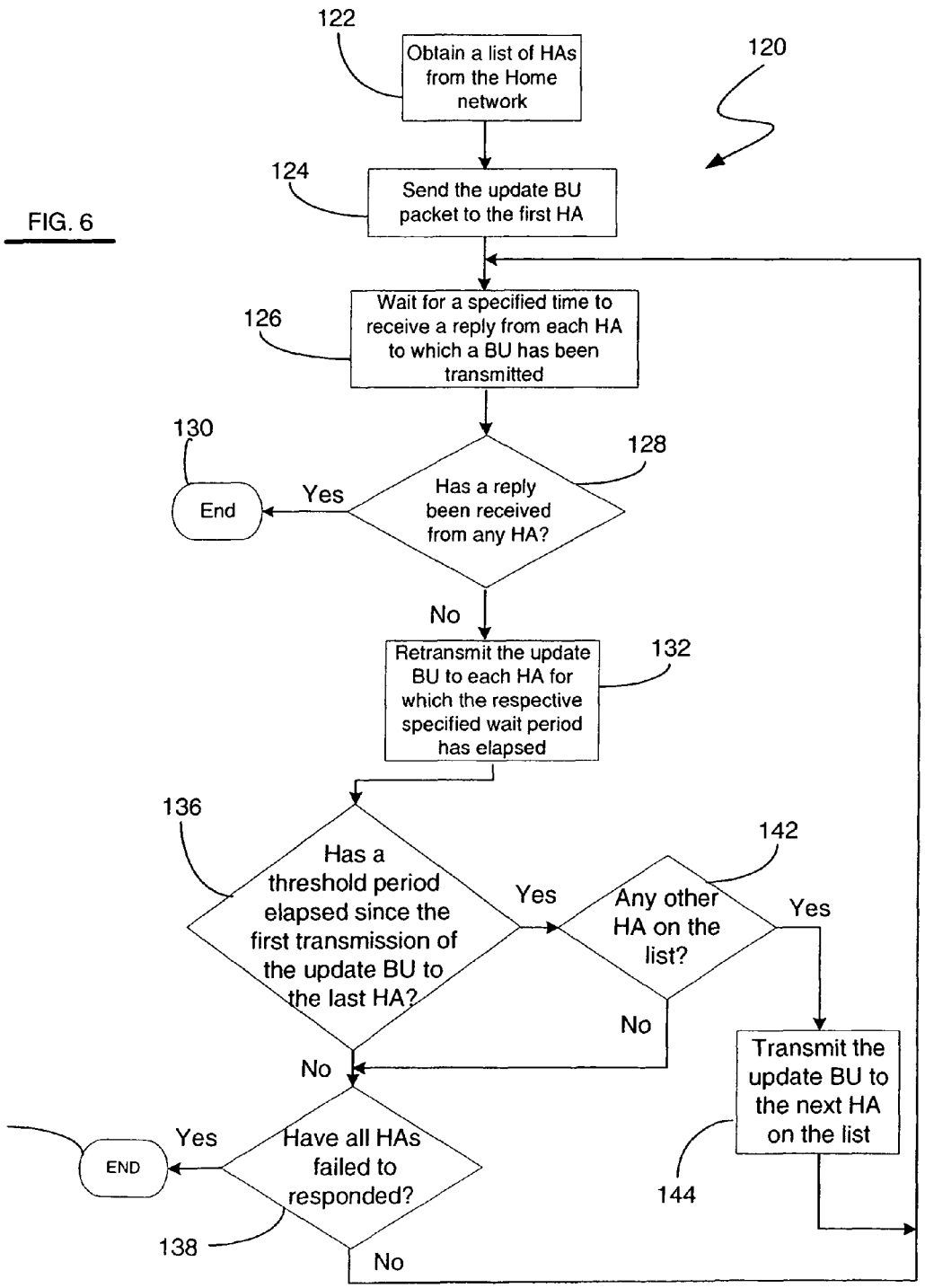
FIG. 6 is a flow diagram depicting the process home registration according to the present invention.

Accordingly, the present invention provides a solution to this problem. Referring to FIG. 6, a process 120 in accordance with an embodiment of the present invention is provided. The process 120 will be described in conjunction with the networks of FIG. 5. As described above, when mobile node 60 moves to network 100, it is referred to as the mobile node 60', which is shown in details in FIG. 5. The process 120 begins by mobile node 60' obtaining a list of home agents that may be able to provide service to it while operating in the foreign network 100, step 122. In one embodiment, the mobile node 60' may obtain the list by reading the list from a storage location within persistent memory 66. In another embodiment, the mobile node 60' obtains the list from the home network. In certain embodiments of the present invention, processor 62 causes the retrieval module 68 to obtain the list of home agents that are capable of supporting mobile node 60'. Where, the retrieval module 68 needs to obtain the list of the home agents from the home network, it may send a DHAAD message to the home network of the mobile node 60'.

In this situation, in response to the DHAAD message or messages similar to the DHAAD message, one of the home agents responds to the mobile node by sending the mobile node a reply message. The reply message typically includes a list of the home agents that are able to support the mobile node 60' while it is operating in the foreign network. In the Example of FIG. 5, home agent 84 sends the reply message listing home agent 84 and 86 as the eligible home agents to provide support to mobile node 60'.

Hereinafter, the rest of the steps in process 120 will be described with reference to the home agents 84 and 86. However, one skilled in the art would realize network 80 may include more than two home agents. In that situation, process 120 is executed for all the listed home agents. Referring back to FIG. 6, in step 124, the mobile node 60' sends an BU message to the first home agent on the list, which is home agent 84. In one embodiment, the processor 62 causes the registration module 70 to send the BU message to the home agents, including home agent 84. This BU message includes the information about the new care-of address of mobile node 60'.

Figure 7:
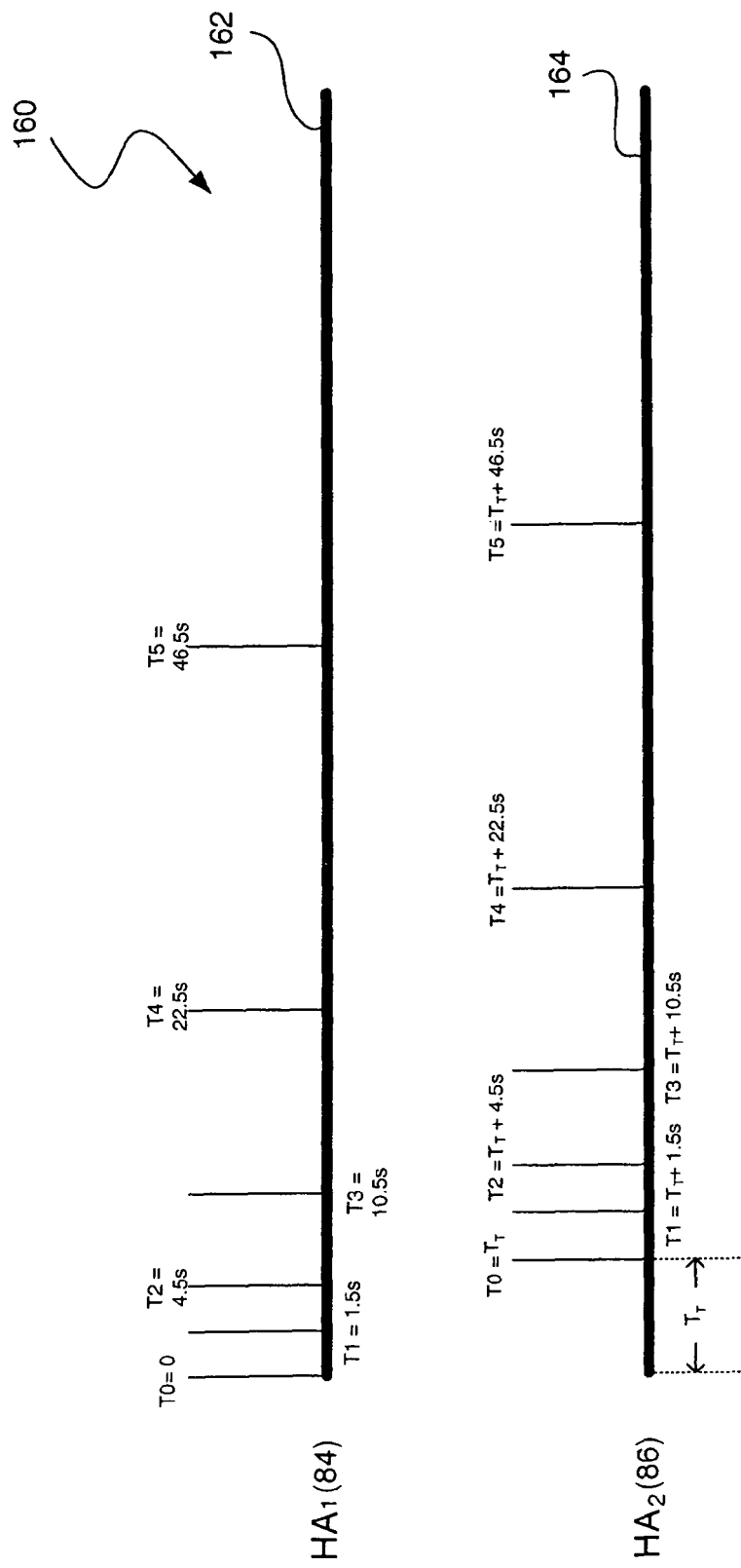
FIG. 7 is a timing diagram showing the timelines for sending BU messages according to an embodiment of the present invention.

Referring to FIG. 7, a timing diagram 160 representing the intervals that BU message is sent to each home agent according to the present invention is shown. Time line 162 shows the time intervals that an BU message is sent to the home agent 84 according to the present invention. Timeline 164 shows the time intervals that an BU message is sent to the home agent 86 according to the present invention. Although two timelines are shown in FIG. 7, it is clear to one skilled in the art that there would be one timeline representing the time intervals that an BU message is sent to each of the home agents on the list obtained by retrieval module 68. For example, if the number of home agents is 3, there would be three timelines in FIG. 7.

Returning to step 124 in FIG. 6, in step 124, the first BU message to the first home agent, i.e., home agent 84, is sent at time T0. Next in step 126, the mobile node 60' waits a specified time for a response from any home agent to which a BU has been transmitted. As shown in FIG. 7, in certain embodiments of the present invention, the second message to any of the home agents is sent 1.5 seconds after the first message, the third message is sent 4.5 seconds after the first message, the fourth message is sent 10.5 seconds after the first message, the fifth message is send 22.5 seconds after the first message, and the last (the sixth) message is sent 46.5 seconds after the first message is sent. It should be noted that if any of the home agents to which BU message has been sent to responds to any of the BU messages listed above, the process ends and registration is completed. However, if a home agent fails to respond to any of the first five BU messages and fails to respond to the last retransmission of the BU message 32 seconds after the last BU message is transmitted, the registration attempt with the particular home agent fails. Thus the total time before it is determined that the registration attempt has failed is 78.5 seconds. Although specific wait periods between each retransmission of the BU registration messages are discussed above, it should be noted that other wait periods may also be used.

In the case where only BU messages has been sent or transmitted to the first home agent on the list, the mobile node 60' waits for a response from the first home agent. However, as it will described below, unless a response is received from the first home agent, the mobile node 60' sends BU messages to the other home agents on the list obtained in step 122. Thus, in accordance with the present invention, the registration process with the other home agents on the list of the home agents begins substantially sooner than it is done in the currently available method of registration.

Next, in step 128, it is determine whether a response has been received from any of the home agents to which an BU message has been transmitted while the mobile node 60' has been waiting. If a response has been received, then the home registration process has been successful and the process ends, step 130. This means that mobile node 60' was able to successfully register with a home agent in its home network.

On the other hand, if the response in step 128 is negative, the BU message is retransmitted, step 132, to the home agents for which the specified wait period has been elapsed. In the example of FIG. 5, the BU message has only been sent to home agent 84. In step 124, the BU message will be retransmitted to home agent 84 once it is determined that the specified wait period as discussed above has elapsed and that home agent 84 has not responded to the first transmission of the BU message. Next, in step 136, it is determine whether a threshold time has elapsed since the first transmission of the BU message to the most recent home agent on the list. In the example of FIG. 5, so far in this process, the most recent home agent is home agent 84. Therefore, it is determine whether a threshold time has elapsed since the first BU message was sent to home agent 84. This threshold time could be any time no less than the minimum time for which the mobile node 60' must wait to receive a response after the first transmission of the BU message to any one of the home agents. In certain embodiments of the present invention, the minimum time is 1.5 seconds. In addition, the threshold time may not be more than a maximum time that mobile node 60' must wait before it sends the BU message to the next home agent. In certain embodiment of the present invention, this maximum time is 78.5 seconds. In other embodiments of the present invention where the wait period to retransmit the BU registrations are governed by a particular protocol, such protocol determines the minimum and maximum limits of the threshold time. It should be noted that the more the threshold time is closer to the minimum wait time, the more improvement may be realized in accordance with the present invention. The inventors of the present invention suggest a threshold time of 4.5 seconds. If it is determined in step 136 that the threshold time has not elapsed, it is determined in step 138 whether a situation exists, wherein all of the home agents listed in the list obtained in step 122 have failed to respond to the BU message from mobile node 60'. If the answer is yes, mobile node 60' fails to register with its home network and process ends, step 140. In this highly unlikely situation, the mobile node 60' cannot be reached by other nodes until it successfully completes its home registration in another try. However, if the answer in step 138 is no, the control goes back to step 126 and the process continues.

If the answer to the test in step 136 is yes, another test is conducted in step 142 to determine whether any other home agents are listed in the list obtained in step 122. If the response to this test is no, the control is transferred to step 138 and the process continues as described above. If the response to the test in step 142 is yes, the BU message will be sent to the next home agent on the list for the first time (step 144), the control is transferred to step 126, and the process continues as described above. In the example of FIG. 5, the next home agent on the list is Home agent 86. In this example, mobile node 60' sends the BU message to home agent 86 in accordance with the timeline 164.

Referring back to FIG. 7, in accordance with the present invention and contrary to the currently available method of home registration, the first registration message (BU message) to the next home agent on the list of the home agents, (in this example, it is home agent 86) is sent a short period of time, in this example 4 second, after the first registration message was sent to the previous home agent (in this example, home agent 84). Thus, according to the present invention, the registration messages are sent to the other home agents substantially sooner that it is done in the prior art. As mentioned above, according to the prior art method of home registration, the first registration message to the next home agent on the list of the home agents is send 78.5 seconds after the first registration message to the current home agent was sent. This results in a substantially slower home registration process. Thus, the present invention facilitates a substantially faster home registration by a mobile node by engaging the next home agent on the list of the home agents in the registration process much faster than the prior art.

In addition, in certain embodiments of the present invention, steps 124-144 are performed by the registration module 60. The processor 62 directs the registration module 60 to perform the individual steps. The registration module 60 may include individual modules to perform steps 124-144. In certain embodiment of the present invention, registration module 60 may include a module to send the BU messages to each home agents, a module to keep track of which home agents has been send an BU message, a module to determine whether the threshold time has elapsed, a module to determine whether the respective wait period has elapsed with respect to each home agent, and other modules to perform the functions described above.

Advantage Over the Currently Available Registration Methods

As it was discussed above in the Background section, according to the currently available methods of home registration, as long as the mobile node 60' does not receive an acknowledgement from the first home agent, it must retransmit the BU message to the first home agent until a maximum time has elapsed since the first transmission was sent to the first home agent. This means that in accordance with the protocol set forth in Mobile IPV6 standard, the mobile node must wait for 78.5 seconds before it can send the BU message to the next home agent on the list. Now if, for example, the list includes 5 home agents and first 3 are not functioning for any reason, the mobile node must wait 235.5 seconds (3×78.5) before it can transmit the BU message to the fourth home agent on the list. Assuming that the fourth home agent responds after 1 second, the total time that it would take a mobile node in this example to register with the home network would be 236.5 seconds (235.5+1). Thus, the time it takes for the mobile node to successfully register with the home network in accordance with the current protocol, would be governed by the following equation:

$$T_{Total} = N*(78.5) + T_{Response}$$

wherein N represents the total number of home agents that failed to acknowledge the receipt of the BU message and $T_{Response}$ is the time it takes for the next home agent to acknowledge the receipt of the BU message. In today's world, the mobile nodes must register with home network much faster to be able to continue providing uninterrupted service to the users.

The process of the present invention reduces this time by a substantial factor. In the example of having five home agents, in accordance to the present invention, the mobile node first will transmit the BU message to the first home agent on the list. Next, while the mobile node continues retransmitting to the first home agent as described above, it begins the transmission of the BU message to the next home agent after a threshold period.

Assuming that the threshold period is 4.5 seconds, according to the present invention, the mobile node will transmit the BU message to a new home agent 4.5 seconds after it has transmitted the first BU message to the previous home agent. Thus, in the above example where the first three home agents are not functioning properly and the fourth home agent responds to the mobile node, the mobile node will receive an acknowledgement from the fourth home agent after 13.5 seconds (3×4.5 seconds) plus the time that it would take for the fourth home agent to send an acknowledgement response. The total registration time for a mobile node in accordance with the present invention is determined by the following equation:

$$T_{Total} = N*(T_T) + T_{Response}$$

wherein N represents the total number of home agents that failed to acknowledge the receipt of the BU message, $T_T$ represents the threshold period, and $T_{Response}$ is the time it takes for the next home agent to acknowledge the receipt of the BU message. Assuming that the fourth home agent responds after 1 second in the above example, the total time to register in accordance with the present invention would be 14.5 seconds [(3*4.5)+1] as oppose to 236.5 seconds [(3*78.5)+1] registration time according to the prior art method of registration. This represents a reduction in registration time by about 94 percent, which is a substantial reduction in the registration time.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

At least certain of the operations illustrated in FIG. 6 may be performed in parallel as well as sequentially. In alternative embodiments, certain of the operations may be performed in a different order, modified or removed.

The scope of the invention is, therefore, indicated by the appended claims rather than by the foregoing description. All changes which come within the meaning and range of equivalency of the claims are to be embraced within their scope.

What is claimed is:

1. A method of home registration by a mobile node when the mobile node moves to a foreign network, comprising:

the mobile node performing a first registration by sending a first plurality of registration messages to a first home agent, wherein a next one of the first plurality of registration messages is sent to the first home agent if the first home agent fails to respond to a current registration message sent to it and wherein the first registration fails if the first home agent fails to respond to the first plurality of registration messages within a first predetermined time; and performing a second registration by sending a registration message to a second home agent while sending registration requests to said first home agent until said first predetermined time has elapsed, wherein a first registration message is sent to the second home agent if the first home agent fails to respond to a current one of the first plurality of registration messages and a second predetermined time has elapsed since a first one of the first plurality of registration messages is sent, wherein at least two home agents are available for registration for the mobile node at any given time;

wherein the second predetermined period of time is shorter than the first predetermined period of time, and the second time period is directed to communication with the second home agent and the first period of time is directed to the first home agent.

2. The method of claim 1, wherein the first and second hone agents are included in a list of the home agents that is obtained from a home network of the mobile node prior to sending a first plurality of the registration messages to the first home agent.

3. The method of claim 1, wherein the first and second home agents are included in a list of the home agents that is an existing list stored within the mobile node.

4. The method of claim 1, wherein the mobile node moves to the foreign network from its home network.

5. The method of claim 4, wherein the home network includes the first and second home agents.

6. The method of claim 1 wherein the mobile node moves to the foreign network from a network other than its home network.

7. A method of home registration by a mobile node when the mobile node moves to a foreign network, comprising:

the mobile node performing a first registration by sending a first plurality of registration messages to a first home agent; and the mobile node performing a second registration by sending a registration message to a second home agent while sending registration messages to the first home agent, wherein a first registration message is sent to the second home agent upon failure of the first home agent to respond to a current one of the first plurality of registration messages and a second predetermined time has elapsed since a first one of the first plurality of registration messages is sent;

wherein during a predetermined time period, the mobile node simultaneously sends registration requests to the first home agent and the second home agent.

8. The method of claim 7, wherein the first and second hone agents are included in a list of the home agents that is obtained from a home network of the mobile node prior to sending a first plurality of the registration messages to the first home agent.

9. The method of claim 7, wherein the first and second home agents are included in a list of the home agents that is an existing list stored within the mobile node.

10. The method of claim 7, wherein the mobile node moves to the foreign network from its home network.

11. The method of claim 10, wherein the home network includes the first and second home agents.

12. The method of claim 7, wherein the mobile node moves to the foreign network from a network other than its home network.

13. A non-transitory computer-readable medium including instructions to execute an operation to enable a mobile node to register with its home network when the mobile node moves to a foreign network, the instructions comprising:

instructions for performing a first registration by sending a first plurality of registration messages to a first home agent, wherein a next one of the first plurality of registration messages is sent to the first home agent if the first home agent fails to respond to a current registration message sent to it and wherein the first registration fails if the first home agent fails to respond to the first plurality of registration messages within a first predetermined time; and instructions for performing a second registration by sending a registration message to a second home agent while sending registration requests to said first home agent until said first predetermined time has elapsed, wherein a first registration message is sent to the second home agent if the first home agent fails to respond to a current one of the first plurality of registration messages and a second predetermined time has elapsed since a first one of the first plurality of registration messages is sent, wherein at least two home agents are available for registration for the mobile node at any given time, and wherein the second predetermined period of time is shorter than the first predetermined period of time, and the second time period is directed to communication with the second home agent and the first period of time is directed to the first home agent.

14. The medium of claim 13, wherein the first and second home agents are included in a list of home agents.

15. The medium of claim 14, further comprising the operation retrieving the list of home agents by obtaining the list of home agents from the home network prior to sending the first plurality of registration messages.

16. The medium of claim 14, further comprising the operation retrieving the list of home agents by accessing an existing list of home agents prior to sending the first plurality of registration messages.

17. A mobile node comprising:

a processor unit;

a registration unit operatively coupled to the processor unit, the registration unit to enable the processor unit to register with a home network of a mobile node when the mobile node moves to a second network;

by sending a first plurality of registration messages to a first home agent, wherein a next one of the first plurality of registration messages is sent to the first home agent if the first home agent fails to respond to a current registration message sent to it and wherein the first registration fails if the first home agent fails to respond to the first plurality of registration messages within a first predetermined time; and by sending a registration message to a second home agent, wherein the registration message is sent to the second home agent if the first home agent fails to respond to a current one of the first plurality of registration messages and a second predetermined time has elapsed since a first one of the first plurality of registration messages is sent, wherein at least two home agents are available for registration for the mobile node at any given time, and wherein the second predetermined period of time is shorter than the first predetermined period of time, and the second time period is directed to communication with the second home agent and the first period of time is directed to the first home agent.

18. The mobile node of claim 17, wherein the first and second home agents are included in a list of home agents.

19. The mobile node of claim 18, further comprising a retrieval unit to obtain the list of the home agents.

20. The mobile node of claim 19, wherein the retrieval unit obtains the list of home agents by obtaining the list from the home network prior to the registration unit sending the registration messages to the first home agent.

21. The mobile node of claim 19, wherein the retrieval unit obtains the list of home agents by accessing an existing list of home agents stored within the mobile node.

* * * * *